United States Patent [19]

Chuan et al.

[11] 4,223,559

[45] Sep. 23, 1980

[54] APPARATUS AND METHODS FOR DETECTING AN INCIPIENT FIRE CONDITION

[75] Inventors: Raymond L. Chuan, Los Angeles; Houston D. Chen, Santa Ana, both of Calif.

[73] Assignee: Brunswick Corporation, Skokie, Ill.

[21] Appl. No.: 904,229

[22] Filed: May 9, 1978

[51] Int. Cl.[3] .............................................. G01N 15/02

[52] U.S. Cl. ................................ 73/432 PS; 340/627

[58] Field of Search .............. 73/28, 421.5 A, 432 PS; 340/627, 628, 629, 630; 250/222 PC, 573, 574; 356/438, 439, 440, 335

[56] References Cited

U.S. PATENT DOCUMENTS

| | | | |
|---|---|---|---|
| 3,678,487 | 7/1972 | Ludewig, Jr. et al. | 73/432 PS |
| 3,719,089 | 3/1973 | Kelsall et al. | 73/432 PS |
| 3,953,844 | 4/1976 | Barr et al. | 73/28 |
| 4,035,788 | 7/1977 | Barr | 340/627 |

*Primary Examiner*—Stephen A. Kreitman
*Attorney, Agent, or Firm*—Finnegan, Henderson, Farabow, Garrett & Dunner

[57] ABSTRACT

Apparatus and methods for detecting an incipient fire condition based on a shift in the size distribution of particles generated by a developing incipient fire condition. Particulate mass concentrations of at least two different particulate sizes are monitored and the ratio of the outputs from the sensing devices is processed as an indication of an incipient fire condition. In another form of the invention, the rate of change of the ratio of the outputs from the monitoring devices is processed as an indication of an incipient fire condition.

30 Claims, 5 Drawing Figures

FIG 4
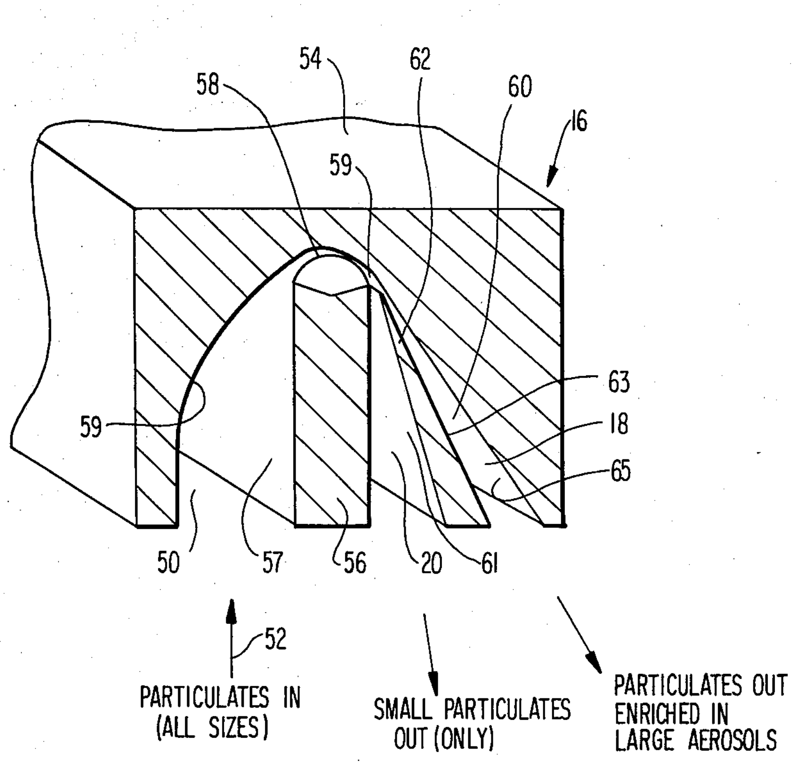
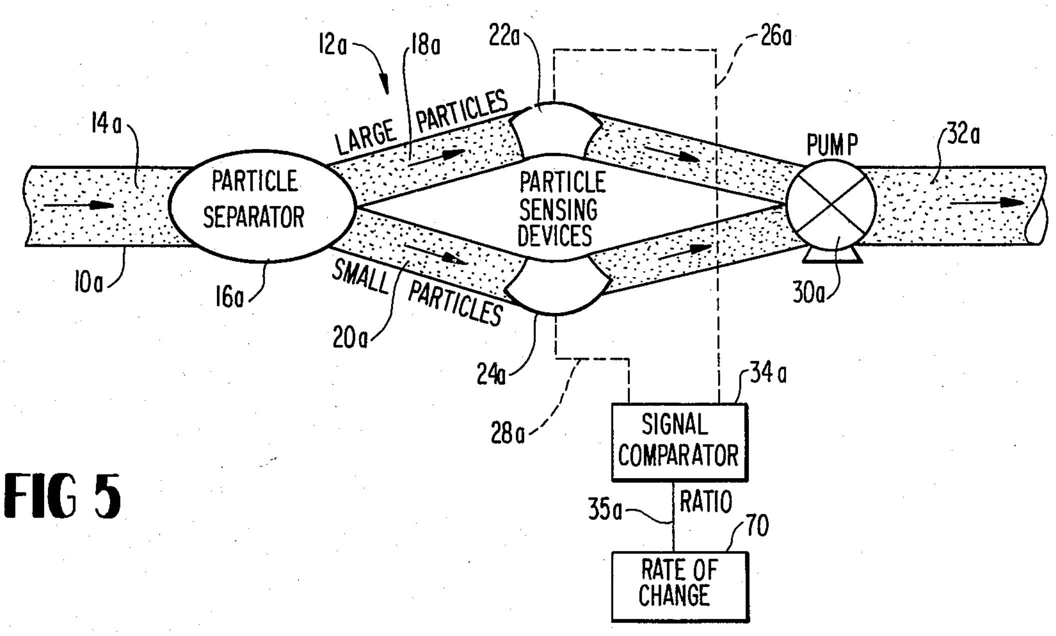
FIG 5

APPARATUS AND METHODS FOR DETECTING AN INCIPIENT FIRE CONDITION

BACKGROUND OF THE INVENTION

The present invention relates to apparatus and methods for detecting an incipient fire condition and particularly relates to an incipient fire detector and methods of detection which utilize the shift in particulate size distribution and particularly the ratio of the outputs of sensors sensing particulates of different sizes as an indication of an incipient fire condition.

Fire detection devices and systems available today embody a wide variety of principles. Most are based on the presence of flame, smoke, a preselected temperature level, or the like. Many of these detect a fire only after combustion actually occurs. Others provide for detection of an incipient fire condition. Detectors of the latter type detect the increase in the submicron particulates given off by combustible materials when heated but before the actual onset of combustion. Examples of incipient fire detectors are described and illustrated in U.S. Pat. No. 3,953,844, and U.S. Pat. No. 4,035,788, both of common assignee herewith. In the former patent, there is disclosed an incipient fire detector having a collector for particulates of a specified size, directing them to a sensor having an output which is a function of the increase in mass of the particulates sensed. The rate of change of the output in comparison with a predetermined value gives an indication of an incipient fire condition.

Discrimination among the various particulates in a fluid which indicate an incipient fire condition and those that do not is an important aspect in incipient fire detection and the prevention of false alarms. The system disclosed in U.S. Pat. No. 3,953,844 achieves a degree of discrimination in that only particles smaller than a predetermined size are presented to and detected by the sensor. However, there are situations where significant amounts of particulates even of that small size are created, and which are different from or exceed in concentration those normally present in the atmosphere in that size range and which could set off an alarm. Such alarms would not necessarily represent a developing combustion situation and would constitute false alarms. The disclosure of U.S. Pat. No. 4,035,788 is similar in this respect.

Furthermore, the proximity of the fire detector to the source of particles it is detecting, in that type of detector where particulate concentration is being detected, is often a factor in the efficacy of such fire detectors. For example, where the rate of change of the mass concentration of particulates is being measured, it is preferred that the detector be located in close proximity with the source of the hazardous condition. Otherwise, fire may break out before the mass concentration has reached the activation level at a remote alarm, and the purpose of the incipient fire detector is defeated. Because it is usually not known precisely where a hazardous condition will arise, a number of incipient fire detectors of this type are required to be spaced about the area being monitored. Obviously, this is not economical.

SUMMARY OF THE INVENTION

In the present invention it has been discovered that the particle size distribution of detectable particulates undergoes a significant shift as an incipient fire condition develops. Particularly, it has been discovered that, in the initial stages in the pyrolysis of a material, the particulate size distribution of the particulates in the fluid, e.g. the atmosphere, is dominated by small particles, typically much less than 0.5 $\mu$m (micron) in size. As the pyrolytic process approaches self-sustaining flaming combustion, the concentration of particulate mass in the fluid in the large size range, for example near 1 micron in diameter, exceeds that of the concentration of particulate mass in the small size range by a significant factor. During experimentation, the concentration of particulate mass in a number of size bands was actually measured and charted to form a "fire signature" which expressed quantitatively the particle size distribution. For all of the materials which were studied, this signature underwent a significant and sudden change in shape as an incipient fire condition developed.

Still further, it has been found that if the ratio is taken of the mass concentration of particulates of two different sizes, preferably a large size to a small size, the ratio itself changes by a significant factor between the early stages of a developing fire to the stage shortly before a sustained burn begins. This particle size distribution shift and the behavior of the size ratio are utilized in the present invention as an indication of an incipient fire condition. Also, the use of the ratio concept avoids the need to place the detector adjacent to the hazardous source.

Accordingly, it is a primary object of the present invention to provide novel and improved apparatus and methods for incipient fire detection.

It is another object of the present invention to utilize the shift in particle size distribution of submicron particulates in determining that an outbreak of fire is about to occur.

It is another object of the present invention to provide apparatus and methods for incipient fire detection wherein the mass concentration ratio of two distinct particulate sizes is used as an indication of an incipient fire condition.

It is still another object of the present invention to provide apparatus and methods for incipient fire detection wherein the detector can be positioned at a location significantly further remote from the source of the incipient fire in comparison with known incipient fire detectors while providing an indication of an incipient fire condition well in advance of an actual fire.

It is a further object of the present invention to provide apparatus and methods for incipient fire detection wherein a ratio of the mass concentration at two discrete particulate sizes is utilized as an indication of an incipient fire situation.

It is yet another object of the present invention to provide apparatus and methods for incipient fire detection wherein the rate of change of the ratio of particulate mass concentration at two discrete sizes in comparison with a predetermined rate of change is utilized as an indication of an incipient fire condition.

Additional objects and advantages of the invention will be set forth in part in the description which follows, and in part will be obvious from the description or may be learned by practice of the invention. The objects and advantages of the invention may be realized and attained by means of the instrumentalities and combinations particularly pointed out in the appended claims.

To achieve the foregoing objects and in accordance with the purpose of the present invention, as embodied and broadly described herein, an incipient fire detector of the present invention comprises means defining a flow path for fluid containing particulates generated by an incipient fire condition, first means for sensing particulates of a first predetermined size flowing along the fluid flow path and for providing a first output in response thereto, second means for sensing particulates of a second predetermined size flowing along the fluid flow path and for providing a second output in response thereto, and means coupled to the first sensing means and the second sensing means for providing a ratio of the first output and the second output as an indication of an incipient fire condition.

Preferably, the incipient fire detector hereof includes means for separating particulates in the fluid flow path in accordance with their size to provide discrete first and second fluid flow passages in the flow path containing particulates of the first predetermined size and the second predetermined size, respectively, the first sensing means being disposed to sense particulates of the first predetermined size flowing in the first fluid flow passage and the second sensing means being disposed to sense particulates of the second predetermined size flowing in the second fluid flow passage.

Further, in another embodiment of the present invention, means for processing the ratio as an indication of an incipient fire condition is provided. In a preferred form hereof, the processing means includes means providing a signal of a value proportional to the ratio of the first output and the second output, means providing a predetermined value, and means for comparing the signal value and the predetermined value to provide an indication of an incipient fire condition when the signal value obtains a specified value in relation to the predetermined value.

Still further, in another embodiment of the present invention, the processing means includes means for detecting a rate of change in the ratio of the outputs from the sensing means as an indication of an incipient fire condition.

In still another embodiment of the present invention, there is provided an incipient fire detector for detecting an incipient fire condition by the presence of particulates in a fluid where concentration of particulates in the fluid increase during an incipient fire condition comprising means for monitoring, at least on a partial basis, the size distribution of particulates in the fluid, and means for sensing a shift in the particulate size distribution in the fluid as an indication of an incipient fire condition.

To further achieve the foregoing objects and advantages in accordance with the present invention, there is provided a method for detecting an incipient fire condition by the presence of particulates in a fluid comprising the steps of sensing particulates of a first predetermined size in the fluid and providing a first output in response thereto; sensing particulates of a second predetermined size in the fluid and providing a second output in response thereto; and providing a ratio of the first output and the second output as an indication of an incipient fire condition.

Still further, the foregoing objects and advantages of the present invention are additionally achieved in the provision of a method of detecting an incipient fire condition by the presence of particulates in a fluid where the concentration of particulates in the fluid increases during an incipient fire condition comprising the steps of monitoring at least on a partial basis the size distribution of particulates in the fluid, and sensing a shift in the particulate size distribution in the fluid as an indication of an incipient fire condition.

The accompanying drawings, which are incorporated in and constitute a part of this specification, illustrate two embodiments of the present invention and, together with the specification, serve to explain the principles of the invention.

BRIEF DESCRIPTION OF THE DRAWINGS

FIG. 4 is a fragmentary, perspective view, in section, of a schematic of a particle separator used in conjunction with the embodiment of the present invention illustrated in FIG. 3; and FIG. 5 is a view similar to FIG. 3 illustrating a further embodiment of the present invention.

DESCRIPTION OF THE PREFERRED EMBODIMENTS

Figure 3:
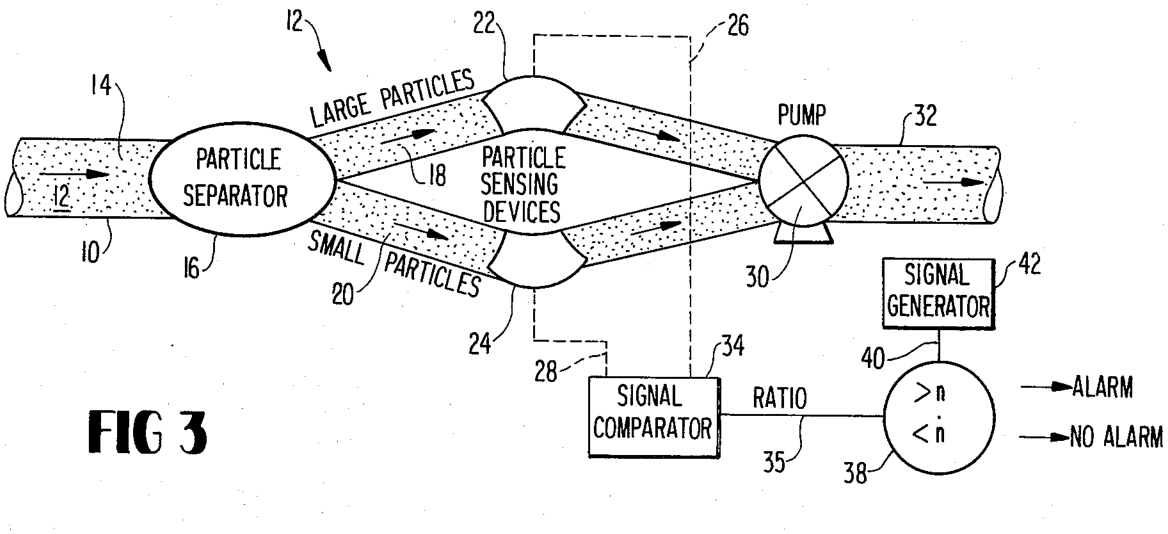
FIG. 3 is a schematic illustration of a preferred embodiment of an incipient fire detector constructed in accordance with the teachings of the present invention.

Reference will now be made in detail to the principles of the present invention and to the present preferred embodiment of the invention, an example of which is illustrated in FIG. 3 of the accompanying drawings.

Figure 1:
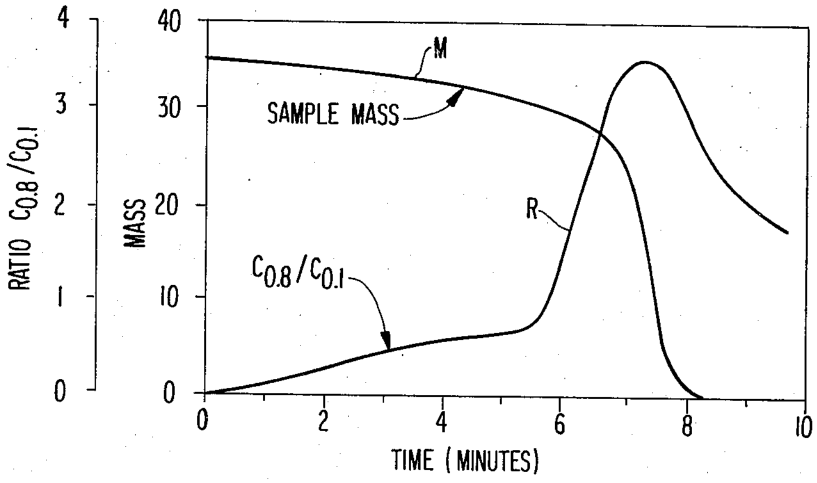
FIG. 1 is a graphical representation of the mass loss and the ratio of concentrations of particulates of two different sizes as a function of time in an incipient fire condition.

Referring first, however, to FIG. 1, there is illustrated a graph showing plots of a sample mass and a ratio of two different particulate mass concentrations along the ordinate against time along the abscissa for an incipient fire condition. The plot of mass versus time, indicated M, illustrates the progress of a pyrolytic material towards combustion. It can be seen from the graph that as the pyrolytic process proceeds with time the mass decreases initially at a modest rate. As the process approaches self-sustaining combustion, the rate of mass loss increases until combustion is reached at which time the mass decreases precipitiously until totally consumed.

For the same time period, the plot R illustrates the ratio of the mass concentration of particulates of a first predetermined size to the mass concentration of particulates of a second predetermined size. From the graph illustrated in FIG. 1, it is noted that this mass concentration ratio increases at a modest rate during the early phases of pyrolysis where the rate of decrease of the mass is also modest. This ratio R, however, increases rapidly, i.e. its slope increases at a substantial rate, just before the material enters its precipitous mass loss or combustion phase. Consequently, it will be seen that the behavior of the mass concentration ratio based upon selected particle sizes can be and, in accordance with the principles of the present invention, is utilized as the basis for detection of an incipient fire condition wherein a slowly smoldering mass approaches the combustion phase.

More specifically, the particular plots illustrated in the graph of FIG. 1 are the results of a laboratory test utilizing a sample of alpha-cellulose in an incipient fire condition as it progresses through combustion. Still referring to FIG. 1, if $C_{0.8}$ is the mass concentration of particulates in a fluid, e.g. atmosphere, of a size approximately 0.8 micron, and $C_{0.1}$ is the mass concentration of particulates in the same fluid of a size approximately 0.1 micron, it will be seen that the ratio $C_{0.8}/C_{0.1}$ is less than 1 in the early stages of the incipient fire condition. This ratio increases with time at a modest rate but rapidly attains and exceeds 1 while still in an incipient stage. As the pyrolytic process proceeds further with time, the ratio of the two particulate mass concentrations increases precipitously to a vâlue, for example on the order of greater than 3, just before combustion occurs.

It will be appreciated that the foregoing specific example using alpha-cellulose as the test material is illustrative only and that the particulate sizes used in the ratio are also illustrative. Further, it will be appreciated that the size distribution is a critical factor in the present invention rather than the mass concentration of a particular size of particulates.

Figure 2:
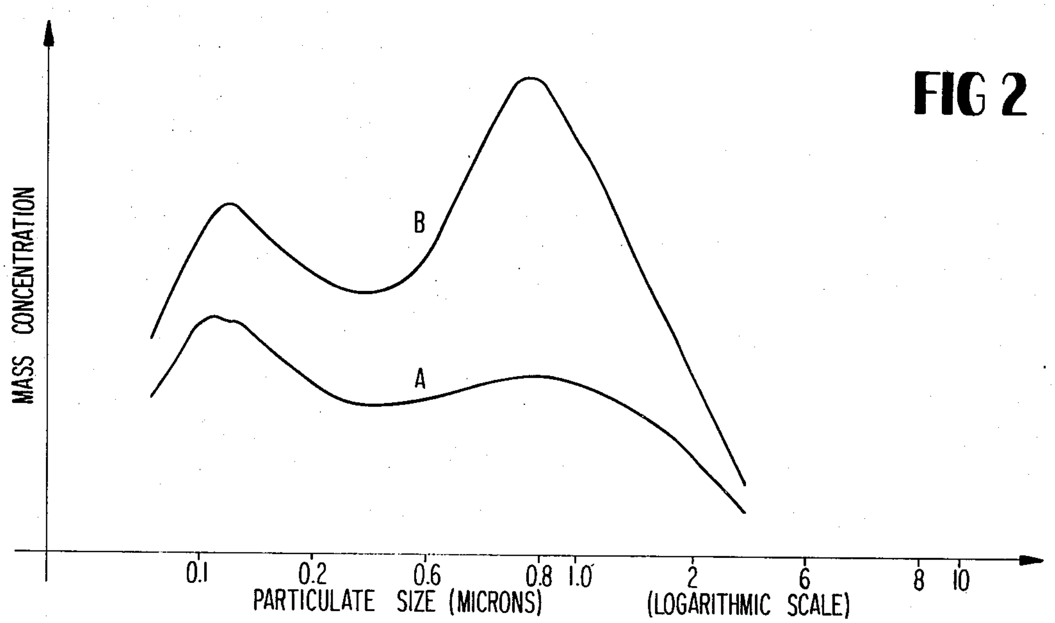
FIG. 2 is a graphical representation of particulate size distribution curves of the particles during an incipient fire condition.

In accordance with the present invention, it has been discovered that, in an incipient fire condition where particulates in a fluid increase in concentration, the size distribution of particulates in the fluid shifts as the incipient fire condition progresses to a sustained burn and that this shift in the size distribution is an indication of an incipient fire condition. More particularly, in the initial stages of pyrolysis, the aerosol size structure is dominated by small particles, typically much less than 0.5 micron in size. This particulate size distribution is graphically illustrated in FIG. 2 by a distribution curve designated A. In the above described example in connection with FIG. 1, the curve A indicates the greatest concentration of particles to be of a size of about 0.1 micron.

As the pyrolytic process approaches a self-sustaining burn, the particulate size structure is dominated by larger particles. This particulate size distribution is also graphically illustrated in FIG. 2 by a distribution curve designated B. In the foregoing example of FIG. 1, the curve B indicates the greatest concentration of particles, during this later stage of the incipient fire condition, to be of particles of a size of about 0.8 micron. Thus, the size distribution of particulates generated by an incipient fire condition, rather than the concentration of particles of a particular size as in the previously noted two prior patents, is monitored in accordance with the present invention as an indication of an incipient fire condition.

More specifically, the concentration of two different particulate sizes can be monitored as an indication of the size distribution, and, and hence an incipient fire condition, when the monitored size distribution shifts. Preferably the two particulate sizes to be monitored are chosen such that the concentration of one size during an incipient fire condition dramatically increases in comparison with the concentration of the other size which also increases but not at as high a rate. In the above example, experimentation has demonstrated that the concentration of larger particles of alpha-cellulose in the 0.8 micron size range increases dramatically in comparison with the much smaller increase in concentration of the particles in the 0.1 micron size range during an incipient fire condition.

Further, the fire detection apparatus of the present invention can detect the development of an incipient fire condition at locations considerably more remote from the developing incipient fire condition in comparison with those detection apparatus which rely on detection of an increase in the mass concentration of the particles as an indication of the incipient fire condition. It will be appreciated that the concentration of particles decreases by particle diffusion as a function of increasing distance from the incipient fire condition and therefore detectors of this latter type may not function at all at remote distances. However, the shift in the size distribution is the same at near, remote and intermediate locations relative to the incipient fire condition. Consequently, whereas a substantial number of prior art incipient fire detectors are necessary for disposition at various locations to detect the increased particle concentration as an indication of an incipient fire condition, the present invention eliminates that requirement since the size distribution can be detectable at remote locations even with high diffusion of the particle concentrations.

Referring now to FIG. 3, there is schematically illustrated an improved incipient fire detector utilizing the principles of the invention. In accordance with the invention, means are provided defining a flow path for fluid containing particulates generated by an incipient fire condition. In this embodiment, a housing 10 defines a fluid flow path, represented generally by the arrow 12, and which path 12 includes an inlet 14 through which particulates enter to be processed by the incipient fire detector. It will be appreciated that the particulates are suspended in a fluid such as air. Particle separator 16 is disposed in flow path 12 and is connected at the end of inlet 14.

In accordance with the invention, there are means for separating particulates in the fluid flow path in accordance with their size to provide discrete first and second fluid flow passages in the fluid flow path containing particulates of a first predetermined size and a second predetermined size, respectively. As embodied herein, two flow passages 18 and 20 in fluid flow path 12 are coupled to respective outlets of a particle separator generally indicated 16, and receive particles of a predetermined size. For example, and with specific reference to the incipient fire condition described above in connection with the alpha-cellulose material and FIG. 1, larger particles, although submicron, including those 0.8 micron in size may be delivered to and flow along flow passage 18 while smaller particles including those 0.1 micron in size may be delivered to and flow along flow passage 20. A preferred form of the particle separator is illustrated in FIG. 4 and is described hereinafter.

In accordance with the present invention, means are provided for monitoring, at least on a partial basis, the size distribution of particulates in the fluid. More particularly, means are provided in the first flow passage for sensing particulates of the first predetermined size flowing along the flow passage. Similarly, means are provided in the second flow passage for sensing particulates of a second predetermined size flowing along the flow passage. For example, sensing means 22 are provided in first flow passage 18 and sensing means 24 are provided in second flow passage 20, each sensing means 22 and 24 providing an output 26 and 28 respectively. Each output is proportional to the mass concentration of the particulates flowing along the associated flow passage and is coupled to a signal comparator 34 described hereinafter. The particular sensing means of sensors 22 and 24 may comprise conventional sensors such as ionization chambers, or optical, or quartz crystal microbalance detectors. For example, ionization detectors, such as the detector described and illustrated in U.S. Pat. No. 4,035,788 of common assignee herewith, may be employed to provide the discrete outputs 26 and 28. Also, oscillating crystal type detectors of the type described and illustrated in U.S. Pat. No. 3,953,844 may be utilized. Accordingly, the disclosure of each of U.S. Pat. Nos. 4,035,788 and 3,953,844 of common assignee herewith is incorporated by reference in this specification as though fully set forth herein. It will be appreciated, however, that other types of crystal oscillators and ionization detectors, as well as other types of particulate detectors, are well-known in the art and that suitable circuits therefor providing the outputs 26 and 28 can be readily found in the public literature.

As illustrated in FIG. 3, the flow passages 18 and 20 at their downstream ends converge for discharge at a pump 30. The fluid discharges from pump 30 through a common outlet 32. Pump 30, of course, serves to draw the fluid containing the particulates into the inlet 14, through particle separator 16 and through the sensors 22 and 24. Consequently, the mass concentration of the particulates in a given environment are continuously and presently monitored.

In a preferred form of the present invention, means for sensing a shift in the particulate size distribution in the fluid as an indication of an incipient fire condition is provided. Particularly, means coupled to the first sensing means and second sensing means for providing a ratio of the first output and the second output as an indication of an incipient fire condition are provided. With specific reference to FIG. 3, sensors 22 and 24 are disposed in relation to flow passages 18 and 20 to measure the mass concentration of the particulates of different sizes in the respective passages 18 and 20 and provide outputs in response thereto as stated previously. Particularly, outputs 26 and 28 from sensors 22 and 24 respectively are fed to a signal comparator 34. Signal comparator 34 establishes a ratio of outputs 26 and 28 and provides an output signal 35 proportional to the ratio of the mass concentrations sensed by the large particle sensor 22 and the small particle sensor 24 as an indication of an incipient fire condition.

In a preferred form of the present invention, means for processing the ratio as an indication of an incipient fire condition is provided. Particularly, and as embodied herein, output signal 35 from signal comparator 34 is connected to an alarm 38. If the output signal exceeds a preset level n in alarm 38, an alarm condition is indicated. As an example, alarm 38 can be a threshold detector. The level of alarm 38 is selected for each specific application of the incipient fire detector hereof depending upon the particle sizes of materials, and the incipient fire condition which the present detector is designed to detect. A signal generator 42 may be used to provide an adjustable signal 40 to alarm 38. The comparison of the ratio of the first and second outputs 26 and 28 from sensors 22 and 24, respectively, and the predetermined signal value 40 is then used as an indication of an incipient fire condition. For example, when the ratio of the mass concentration of the large particles to the mass concentration of the small particles increases precipitously, a level in excess of the predetermined value n will be detected and will actuate an alarm condition. It will be appreciated that conventional circuitry would be activated in the event of an alarm condition and may comprise audible alarms, recording devices, control devices or the like.

It is within the scope of the present invention that sensors 22 and 24 may sense the respective mass concentrations of particulates of different and predetermined sizes as the particulates flow along the single fluid flow path 12 and without physical separation of the particulates into discrete flow passages containing the respective different and predetermined sizes. Preferably, however, the preferred embodiment of the invention provides for physical separation of the different and predetermined sizes into discrete flow passages by means of a particle separator.

Referring now to FIG. 4, there is illustrated a particular and preferred form of particle separator 16 for separating particulates in the fluid flow path 14 in accordance with their size to provide outflow of particulates of discrete sizes in distinct passages. Particularly, separator 16 is of the inertial type wherein the fluid containing the particulates enters through an inlet 50 in the direction of the arrow designated 52. Separator 16 includes a housing 54 having a central section 56. Section 56 has a side wall surface 57 which, together with the opposed wall surface 59, defines inlet 50.

The wall surfaces 57 and 59 converge toward an elongated nozzle 58 which defines an arcuate flow passageway and generally reverses the direction of the fluid flow. The nozzle 58 is sized to provide substantially two-dimensional linear flow and the flow from nozzle 58 is directed through an outlet 59 into a chamber 60. One or more knife edges 62 are disposed in chamber 60 in the path of the flow issuing from nozzle outlet 59. In the illustrated form, knife edge 62 has a side wall surface 61 which defines with the opposed wall surface of central section 56 a discrete aerosol flow passage 20 for small particles. The opposite wall surface 63 of knife edge 62 defines with the opposed wall surface 65 of housing 54 the previously described flow passage 18 for larger particles.

Fluid, containing particulates, enters inlet 50 and is accelerated by the convergence of side walls 57 and 59 to a high velocity for flow into nozzles 58. A substantial two dimensional laminar flow with minimum eddy currents is provided by nozzle 58. Since the nozzle is curved about an elongated axis the suspended particulates inertially separate one from the other with the larger particulates moving toward wall surface 65 and the smaller particulates, being undisturbed, moving into passage 20. The particulates, thus separated by size, enter the flow passages 18 and 20.

It will be appreciated that the knife edge 62 can be adjustably disposed within the outlet chamber 60 of nozzle 58. Further, to obtain the separation of the particulates into desired size bands, two or more knife edges may be disposed in chamber 60 thus providing a high degree of discrimination in the collection of particles of discrete predetermined sizes within the specified size band.

Referring now to the embodiment of the present invention illustrated in FIG. 5, there is disclosed an incipient fire detector similar to the detection apparatus illustrated in FIG. 3 except that, rather than comparing the ratio of outputs from the particle sensors and a predetermined value, the rate of change of the ratio of the outputs from the particulate sensors provide an indication of an incipient fire condition. Accordingly, for those elements of this embodiment illustrated in FIG. 5 and corresponding to identical elements of the embodiment illustrated in FIG. 3, like numerals are assigned followed by the letter designation a. Reiteration of these like elements and their operation is not believed necessary with reference to FIG. 5 because the description with respect to FIG. 3 is applicable.

In this preferred form of the present invention, the processing means includes means for processing a rate of change in the ratio of the sizes or mass concentrations as an indication of an incipient fire condition. Thus, the rate of change of the ratio of outputs 26a and 28a from the particle concentration sensors 22a and 24a, for example the sensors described as to FIG. 3, is used as an indication of an incipient fire condition. Circuitry for sensing a rate of change in this ratio may include a voltage control oscillator 70 for converting the ratio output signal to a pulsating signal 72 which then may be applied as an input to the circuitry described in U.S. Pat. No. 3,953,844, previously referred to, in relation to FIG. 6 of that patent.

The invention may be embodied in other specific forms without departing from the spirit or essential characteristics thereof. The present embodiments are therefore to be considered in all respects as illustrative and not restrictive, and all changes which come within the meaning and range of equivalency of the claims are therefore intended to be embraced therein.

What is claimed and desired to be secured by U.S. Letters Patents is:

1. An incipient fire detector comprising:
- means defining a flow path for a fluid containing particulates generated by an incipient fire condition;
- first means for sensing particulates of a first predetermined size flowing along the fluid flow path and providing a first output in response thereto;
- second means for sensing particulates of a second predetermined size flowing along the fluid flow path and providing a second output in response thereto;
- means coupled to said first sensing means and said second sensing means for providing a ratio of said first output and said second output; and
- means for processing said ratio as an indication of an incipient fire condition.

2. An incipient fire detector according to claim 1 including means for separating particulates in said fluid flow path in accordance with their size and providing discrete first and second fluid flow passages in said flow path containing particulates of said first predetermined size and said second predetermined size, respectively, said first means being disposed to sense particulates of said first predetermined size flowing along said first fluid flow passage, and said second means being disposed to sense particulates of said second predetermined size flowing along said second fluid flow passage.

3. An incipient fire detector according to claim 1 wherein said processing means includes means providing a signal of a value proportional to the ratio of said first output and said second output, means providing a predetermined value, and means for comparing said signal value and said predetermined value to provide an indication of an incipient fire condition when said signal value obtains a specified value in relation to said predetermined value.

4. An incipient fire detector according to claim 1 including means for separating particulates in said fluid flow path in accordance with their size and providing discrete first and second fluid flow passages in said flow path containing particulates of said first predetermined size and said second predetermined size, respectively, said first means being disposed to sense particulates of said first predetermined size flowing along said first fluid flow passage, and said second means being disposed to sense particulates of said second predetermined size flowing along said second fluid flow passage.

5. An incipient fire detector comprising:
- means defining a flow path for fluid containing particulates generated by an incipient fire condition;
- first means for sensing particulates of a first predetermined size flowing along the fluid flow path and providing a first output in response thereto;
- second means for sensing particulates of a second predetermined size flowing along the fluid flow path and providing a second output in response thereto;
- means coupled to said first sensing means and said second sensing means for providing a ratio of said first output and said second output; and
- means for processing a rate of change of said ratio as an indication of an incipient fire condition.

6. An incipient fire detector comprising:
- means defining a flow path for a fluid containing particulates generated by an incipient fire condition;
- first means for sensing particulates of a first predetermined size flowing along the fluid flow path and providing a first output in response thereto;
- second means for sensing particulates of a second predetermined size flowing along the fluid flow path and providing a second output in response thereto;
- means for separating particulates in said fluid flow path in accordance with their size and providing discrete first and second fluid flow passages containing particulates of said first predetermined size and said second predetermined size, respectively, said first means disposed to sense particulates of said first predetermined size flowing along said first fluid flow passage, and said second means being disposed to sense particulates of said second predetermined size flowing along said second fluid flow passage;
- means coupled to said first sensing means and said second sensing means for providing a ratio of said first output and said second output; and
- means for processing a rate of change of said ratio as an indication of an incipient fire condition.

7. An incipient fire detector according to claim 6 wherein said separating means includes means defining an arcuate flow passageway in said fluid flow path for inertially separating the particulates thereby to provide particulates of said first predetermined size and said second predetermined size.

8. An incipient fire detector according to claim 7 wherein said arcuate flow passageway has an inlet and an outlet, and means adjacent said outlet for separating the flow from said arcuate flow passageway into said first and second fluid flow passages, respectively.

9. An incipient fire detector for detecting an incipient fire condition by the presence of particulates in a fluid where the concentration of particulates in the fluid increases during an incipient fire condition comprising:
- means for monitoring, at least on a partial basis, the size distribution of particulates in the fluid; and
- means for sensing a shift in said particulate size distribution in the fluid as an indication of an incipient fire condition.

10. An incipient fire detector for detecting an incipient fire condition by the presence of particulates in a fluid, where the concentration of particulates in the fluid increases during an incipient fire condition, comprising:

means for monitoring, at least on a partial basis, the size distribution of particulates in the fluid, wherein said monitoring means includes a first means for sensing particulates of a first predetermined size in the fluid and providing a first output in response thereto, and a second means for sensing particulates of a second predetermined size in the fluid and providing a second output in response thereto, and means for sensing a shift in said particulate size distribution in the fluid as an indication of an incipient fire condition, wherein said means for sensing a shift includes means coupled to said first sensing means and said second sensing means for providing a ratio of said first output and said second output and means for processing said ratio as said indication of an incipient fire condition.

11. An incipient fire detector according to claim 10 including means for separating particulates in the fluid in accordance with their size and providing discrete first and second fluid flow passages containing particulates of said first predetermined size and said second predetermined size, respectively, said first means being disposed to sense particulates of said first predetermined size flowing along said first fluid flow passage, and said second means being disposed to sense particulates of said second predetermined size flowing along said second fluid flow passage.

12. An incipient fire detector for detecting an incipient fire condition by the presence of particulates in a fluid, where the concentration of particulates in the fluid increases during an incipient fire condition, comprising, means for monitoring, at least on a partial basis, the size distribution of particulates in the fluid, wherein said monitoring means includes a first means for sensing particulates of a first predetermined size in the fluid and providing a first output in response thereto, and a second means for sensing particulates of a second predetermined size in the fluid and providing a second output in response thereto, means for sensing a shift in said particulate size distribution in the fluid, said means for sensing a shift including means coupled to said first sensing means and said second sensing means for providing a ratio of said first output and said second output, and means for processing a rate of change of said ratio as an indication of an incipient fire condition.

13. An incipient fire detector according to claim 12 including means for separating particulates in the fluid in accordance with their size and providing discrete first and second fluid flow passages containing particulates of said first predetermined size and said second predetermined size, respectively, said first means being disposed to sense particulates of said first predetermined size flowing along said first fluid flow passage, and said second means being disposed to sense particulates of said second predetermined size flowing along said second fluid flow passage.

14. An incipient fire detector according to claim 13 wherein said separating means includes means defining an arcuate flow passageway in said fluid flow path for inertially separating the particulates thereby to provide particulates of said first predetermined size and said second predetermined size.

15. An incipient fire detector according to claim 14 wherein said arcuate flow passageway has an inlet and an outlet, and means adjacent said outlet for separating the flow from said arcuate flow passageway into said first and second fluid flow passages.

16. A method of detecting an incipient fire condition by the presence of particulates in a fluid comprising the steps of:

sensing particulates of a first predetermined size in the fluid and providing a first output in response thereto, sensing particulates of a second predetermined size in the fluid and providing a second output in response thereto, providing a ratio of said first output and said second output; and processing said ratio as an indication of an incipient fire condition.

17. A method according to claim 16 including separating particulates in the fluid in accordance with their size, flowing particulates of said first predetermined size along a first passage, flowing particulates of a second predetermined size along a second passage, sensing particulates of said first predetermined size flowing along said first passage and sensing particulates of said second predetermined size flowing along said second passage.

18. A method according to claim 17 wherein the step of separating includes inertially separating the particulates in accordance with their size.

19. A method according to claim 16 wherein the processing of said ratio includes the steps of providing a signal of a value proportional to said ratio and comparing a ratio of said signal value and a predetermined value as an indication of an incipient fire condition.

20. A method for detecting an incipient fire condition by the presence of particulates in a fluid comprising the steps of:

sensing particulates of a first predetermined size in the fluid and providing a first output in response thereto, sensing particulates of a second predetermined size in the fluid and providing a second output in response thereto, providing a ratio of said first output and said second output, and processing the rate of change of said ratio as an indication of an incipient fire condition.

21. A method for detecting an incipient fire condition by the presence of particulates in a fluid, comprising the steps of:

separating particulates in the fluid in accordance with their size and flowing particulates of a first predetermined size along a first passage and flowing particulates of a second predetermined size along a second passage, sensing particulates of said first predetermined size flowing along said first passage and providing a first output in response thereto, sensing particulates of said second predetermined size flowing along said second passage and providing a second output in response thereto;

providing a ratio of said first output and said second output; and processing the rate of change of said ratio as an indication of an incipient fire condition.

22. A method according to claim 21 wherein the step of separating includes inertially separating the particulates in accordance with their size.

23. A method of detecting an incipient fire condition by the presence of particulates in a fluid where the concentration of particulates in the fluid increases during an incipient fire condition, comprising the steps of monitoring, at least on a partial basis, the size distribution of particulates in the fluid, and sensing a shift in said particulate size distribution in the fluid as an indication of an incipient fire condition.

24. A method of detecting an incipient fire condition by the presence of particulates in a fluid, where the concentration of particulates in the fluid increases during an incipient fire condition, comprising the steps of:

(a) monitoring, at least on a partial basis, the size distribution of particulates in the fluid, wherein said monitoring step includes sensing particulates of a first predetermined size in the fluid and providing a first output in response thereto and sensing particulates of a second predetermined size in the fluid and providing a second output in response thereto, and (b) sensing a shift in said particulate size distribution in the fluid as an indication of an incipient fire condition, wherein said step of sensing a shift includes providing a ratio of said first output and said second output, and processing said ratio as said indication of an incipient fire condition.

25. A method according to claim 24 including separating particulates in the fluid in accordance with their size, flowing particulates of said first predetermined size along a first passage, flowing particulates of a second predetermined size along a second passage, sensing particulates of said first predetermined size flowing along said first passage and sensing particulates of said second predetermined size flowing along said second passage.

26. A method according to claim 25 wherein the step of separating includes inertially separating the particulates in accordance with their size.

27. An incipient fire detector comprising:

means defining a flow path for a fluid containing particulates generated by an incipient fire condition;

first means for sensing particulates of a first predetermined size flowing along the fluid flow path and providing a first output in response thereto;

second means for sensing particulates of a second predetermined size flowing along the fluid flow path and providing a second output in response thereto;

separating means defining an arcuate flow passageway in said fluid flow path for inertially separating the particulates in said fluid flow path in accordance with their size and providing discrete first and second fluid flow passages in said flow path containing particulates of said first predetermined size and said second predetermined size, respectively, said first sensing means being disposed to sense particulates of said first predetermined size flowing along said first fluid flow passage, and said second sensing means being disposed to sense particulates of said second predetermined size flowing along said second fluid flow passage;

means coupled to said first sensing means and said second sensing means for providing a ratio of said first output and said second output; and means for processing said ratio as an indication of an incipient fire condition.

28. An incipient fire detector according to claim 27 wherein said arcuate flow passageway has an inlet and an outlet, and means adjacent said outlet for separating the flow from said arcuate flow passageway into said first and second fluid flow passages, respectively.

29. An incipient fire detector for detecting an incipient fire condition by the presence of particulates in a fluid, where the concentration of particulates in the fluid increases during an incipient fire condition, comprising:

means for monitoring, at least on a partial basis, the size distribution of particulates in the fluid, said monitoring means including a first means for sensing particulates of a first predetermined size and providing a first output in response thereto, and a second means for sensing particulates of a second predetermined size and providing a second output in response thereto;

separating means defining an arcuate flow passageway for inertially separating the particulates in said fluid in accordance with their size and providing discrete first and second fluid flow passages containing particulates of said first predetermined size and said second predetermined size, respectively, said first sensing means being disposed to sense particulates of said first predetermined size flowing along said first fluid flow passage, and said second sensing means being disposed to sense particulates of said second predetermined size flowing along said second fluid flow passage;

means for sensing a shift in said particulate size distribution in the fluid, said means for sensing a shift including means coupled to said first sensing means and said second sensing means for providing a ratio of said first output and said second output as said indication of an incipient fire condition.

30. An incipient fire detector according to claim 29 wherein said arcuate flow passageway has an inlet and an outlet, and means adjacent said outlet for separating the flow from said arcuate flow passageway into said first and second fluid flow passages, respectively.

* * * * *